US012756982B2

United States Patent
(12) United States Patent
Thougaard et al.

(10) Patent No.: US 12,756,982 B2
(45) Date of Patent: Oct. 6, 2026

(54) HEARING AID WITH INTERNAL ANTENNA

(71) Applicant: Oticon A/S, Smørum (DK)

(72) Inventors: Morten Thougaard, Smørum (DK); Jens Troelsen, Smørum (DK); Rune Sø, Smørum (DK); Oleksandr Rybalko, Smørum (DK)

(73) Assignee: Oticon A/S, Smørum (DK)

( * ) Notice: Subject to any disclaimer, the term of this patent is extended or adjusted under 35 U.S.C. 154(b) by 138 days.

(21) Appl. No.: 18/940,915

(22) Filed: Nov. 8, 2024

(65) Prior Publication Data

US 2025/0159421 A1 May 15, 2025

(30) Foreign Application Priority Data

Nov. 10, 2023 (EP) .................................... 23208948

(51) Int. Cl.
*H04R 25/00* (2006.01)

(52) U.S. Cl.
CPC ....... *H04R 25/609* (2019.05); *H04R 2225/49* (2013.01); *H04R 2225/51* (2013.01)

(58) Field of Classification Search
CPC .............. H04R 25/609; H04R 2225/49; H04R 2225/51
See application file for complete search history.

(56) References Cited

U.S. PATENT DOCUMENTS

| | | | | |
|---|---|---|---|---|
| 9,807,523 | B2 | 10/2017 | Murray et al. | |
| 11,245,994 | B2 | 2/2022 | Ruaro et al. | |
| 2017/0064467 | A1 | 3/2017 | Fischer et al. | |
| 2018/0317030 | A1* | 11/2018 | Troelsen | H04R 25/554 |
| 2019/0261100 | A1* | 8/2019 | Troelsen | H04R 25/60 |
| 2022/0095064 | A1* | 3/2022 | Laursen | H04R 25/604 |
| 2022/0369049 | A1 | 11/2022 | Ledingham | |
| 2023/0016254 | A1 | 1/2023 | Sø et al. | |

* cited by examiner

*Primary Examiner* — Suhan Ni

(57) ABSTRACT

Disclosed herein are embodiments of a hearing aid having an internal antenna is disclosed. The device can include several substrates, such as a first and a second substrate, where one substrate carrying input transducer is also used as internal antenna for the hearing aid. The internal antenna can be, for example, a radio frequency antenna.

12 Claims, 2 Drawing Sheets

HEARING AID WITH INTERNAL ANTENNA

CROSS REFERENCE TO RELATED APPLICATIONS

Any and all application for which a foreign or domestic priority claim is identified in the Application Data Sheet as filed with the present application are hereby incorporated by reference under 37 CFR 1.57.

TECHNICAL FIELD

The present disclosure relates to the field of hearing aids. More particularly, the disclosure relates to hearing aids having an internal antenna arranged at least partly in an outer structure, such as a housing or encapsulating material, of the hearing aid.

Hearing aids are compact devices which are configured to provide audio signal to individuals with hearing loss. The hearing aid compensates, at least partly, for this loss by processing sounds picked up in the area around the person using the hearing aid. The hearing aid is often configured to compensate for the user's specific hearing loss, e.g. based on measurements performed by a hearing care professional or the user him or herself, such as evaluation based on provision of single tone test signals or the like. Further, such hearing aids may be in wireless communication with other devices, such as communication devices, and for such purposes an antenna is needed. Further, communication interface and/or processing should be included as well. As the size of the hearing aid is small, and usually used in an area at or near the ear, there might be issues with signals reaching the other, external, devices due to loss etc.

Therefore, there is a need to provide a solution that addresses at least some of the above-mentioned problems. The present disclosure further provides at least an alternative to the prior art.

SUMMARY

The present disclosure presents a hearing aid which comprises an outer structure having a first end and an opposite second end. Such an outer structure may be or include a housing, such as a housing comprising one or more shells, or the outer structure may be or comprise an encapsulating material, such as a material encapsulating a large part, a major part or entirely most components of the hearing aid, elements such as contacts may/should still be accessible in some way. The outer structure may be configured to be positioned at the ear of a user. Such configurations may be a so-called behind-the-ear configuration where the outer structure is to be positioned in the area between the user's pinna and skull. The hearing aid may comprise a first substrate arranged in the outer structure. In the present context, the outer structure may be seen as defining a space or volume where the components of the hearing may be placed, depending on the nature of the component, this may be seen as placed entirely or partly. In some instances, one or more components may be individually encapsulated, such as assembled in a package or sub-assembly. The hearing aid may comprise an input transducer arranged at the first substrate. Such an input transducer may be configured to provide a signal representing sound, which sound is mainly ambient sound. The hearing aid may comprise that the first substrate further includes a conductive area being at least part of an antenna, such as a radio frequency antenna. Such an antenna may be configured to support wireless communication at an RF frequency. The hearing aid may be arranged so that the first substrate may be arranged at the first end of the housing. The hearing aid may comprise a battery at the second end of the outer structure. The battery may be arranged inside the outer structure in a holding structure or subassembly where electronic components of the hearing aid may be powered by current from the battery, e.g. via one, two or more electrical connectors. It would be advantageous to place the battery and antenna so that there is a minimal, or no, overlap between the two, as the battery may have an effect on the radiation and/or efficiency and/or bandwidth of the antenna. In case the antenna is positioned on or in a substrate which is connected to other substrate parts or components which are not designed to be part of the antenna, these other, non-antenna substrate parts, may be arranged closer to the battery, such as in contact with or overlapping or in proximity of the battery. There may be placed one or more decoupling components in electrical connections so as to decouple the antenna from one or more parts of the non-antenna substrate. This could include electrical connections to/from input transducers arranged in connection with a substrate comprising an antenna part, such as the first and/or second substrate. The hearing aid may comprise a second substrate, the second substrate may be arranged at least partly in an area between the first substrate and the battery. A part of the second substrate may extend beyond, or at least over a part of, the first substrate and/or the battery. The hearing aid may comprise a wireless interface. Such a wireless interface may include or be a processor encoding/decoding data to be send/received over a wireless connection. The wireless interface may include Bluetooth, or other protocol, functionality. The wireless interface may be configured to transmit and/or receive electromagnetic signals to/from the radio frequency antenna via a feed connected to the first substrate. The wireless interface may be configured to operate at a first operational frequency. Such first operational frequency may include a scheme for frequency hopping, or the like, within a frequency band or number of frequency bands. The hearing aid may comprise a connector configured to (mechanically and electrically) connect to an external speaker unit device. The speaker unit device may be configured to be placed at least partly in an ear canal of the user, such as via a soft interface device, often termed a dome or ear tip device. The hearing aid may comprise at least one decoupling element configured to provide a dampening of electrical signals at/around the first operational frequency. This is contemplated to lower the risk of noise and/or damage to electrical components not intended to receive electrical signals at the operational frequency. Such a decoupling element may be arranged in an electrical path to/from the connector. Thereby electrical signals may be dampened, such as completely or partly removed or lower in intensity, before reaching unintended components. This could for instance be used to prevent radio frequency signal reaching an output transducer positioned in the ear canal or to prevent radio frequency signal reaching an audio signal processor in the hearing aid.

In a hearing aid as described herein, the wireless interface may include, or be connected to, a booster device, such as a signal amplifier/power amplifier to amplify the signal to be transmitted. Such an amplifier may have an override function or bypass function so that when sufficient signal strength in a given situation is possible without the booster function, the amplifier is by-passed to conserve power. This allows the hearing aid to maintain an improved wireless link in situations where link quality is limited, and to conserve battery power in situations where link quality is not challenged. Such determination of link quality may be performed by the wireless interface receiving information from the device with which it is communicating, such as received signal strength, packet loss data or other measure suitable for determining link quality. The wireless interface may also determine that a boost is needed if connection is lost to the other device or that packet loss exceeds a certain threshold. It is considered especially advantageous to use the booster when communicating between a hearing aid placed at an ear of the user and a phone placed in a pocket of the user, such as during a phone call using the hearing aid as a headset, i.e. the hearing aid is performing two-way audio communication with the phone so that the voice of the user is picked up by the hearing aid and the voice of a remote talker is presented to the user via the hearing aid.

For wireless communication, the wireless interface may include an intermediate power storage, such as a capacitor, to be charged prior to a transmission event. This could be done to avoid sudden, large power drains from the battery powering the wireless interface, which could cause electromagnetic noise being emitted during such a sudden power drain from the battery. The intermediate power storage may be charged to a certain level based on a desired data rate for the wireless interface and/or based on a desired power transmission level, which may be independently determined from or prior to the signal entering the mentioned optional booster device.

According to an aspect the present disclosure provides a hearing aid. Such a hearing aid may comprise a housing having a first end and an opposite second end. The housing may be composed of two or more shell-parts, such as a top and bottom part, or be constituted by an encapsulation material covering at least part of components making up the hearing aid with e.g. an epoxy material or other suitable material. The hearing aid may further comprise a first substrate and an input transducer may be arranged at the first substrate. Such an input transducer may be configured to provide a signal representing sound. Such an input transducer may be composed of one, two or more individual microphone units. The first substrate may include a conductive area. This area may be configured so as to function as antenna, or at least part of an antenna function. The antenna may be constructed or configured so that it is restricted or defined by this area alone. Such a restriction or limitation, or at least a part thereof, of the antenna could be established using decoupling components arranged so as to decouple electromagnetic coupling from the area to other, neighboring elements inside the hearing aid, and/or possibly also combined with or solely decoupling of any wires connected to the hearing aid, such as wires leading signals to/from an in-the-ear component. Having an antenna which is more or less isolated from the other components in the hearing aid may to provide an improved antenna efficiency and/or bandwidth. The antenna could be designed so as to include only the first and/or the second substrates. The area may comprise one or more layers in a substrate, such as one or more layers in a printed circuit board-like structure. In a hearing aid according to the present disclosure, the input transducer, and/or the first substrate, may be arranged at the first end of the housing. The input transducer, or at least the first substrate may advantageously be positioned at the first end of the hearing aid, which at least allow the input transducer to pick up sound from the user's environment from an advantageous position. Further, when placing the first substrate at the first end of the hearing aid, this allow, at least part of, the antenna to be positioned at the ear of the user in an area with relatively little material around it. The hearing aid may further comprise a second substrate. This second substrate may be arranged at a distance from the first substrate. The first substrate and the second substrate may be connected, such as via a third substrate, or an extension of one of the first or second substrates. The first substrate and the second substrate may be one substrate where each of the first substrate and the second substrate are shaped individually from the same original piece of substrate. The first substrate and the second substrate may be connected via one or more soldering. The hearing aid may further comprise a processor arranged at the second substrate. Such a processor may be configured to receive the signal representing sound from the input transducer, and the processor may then be further configured to provide a processed output signal based on the received signal representing sound to an output transducer of the hearing aid. Such processing may include hearing loss dependent amplification, either increasing or decreasing certain frequencies or frequency bands dependent on a hearing loss profile. The hearing aid may further comprise that the output transducer is configured to convert the processed output signal to a signal perceivable as sound to a wearer of the hearing aid. The output transducer may be positioned in the housing of the hearing aid to be placed behind the ear of the user, often termed a BTE housing, or in a housing configured to be placed in or at the ear canal of the user, often termed a RITE or RIE hearing aid. The hearing aid may further comprise a wireless interface arranged in the housing. Such a wireless interface may be configured to transmit and/or receive electromagnetic signals to/from the conductive area in the first substrate via a feed connected to the first substrate. The wireless interface may be configured to encode/decode data using a protocol, such as a Bluetooth based protocol, such as Bluetooth LE, Such as AuraCast, such as LE Audio and/or a proprietary protocol or a combination of multiple protocols. The wireless interface may be configured to operate at a first operational frequency. This could be a frequency in the ISM band, such as around 2.4 GHz, such as around 5.1 GHz. The wireless interface may be configured to operate at several operational frequencies, such as at two operational frequencies. The hearing aid may further comprise a connector configured to connect to an external speaker unit device. Such external speaker unit may be configured to be positioned in or at the ear canal of the user/wearer, wherein the connector includes at least one decoupling element configured to provide a dampening of electrical signals at the first operational frequency.

Thus, in an aspect, the present disclosure relates to a hearing aid comprising a housing having a first end and an opposite second end, the housing being configured to be positioned at the ear of a user. The first end and the second end may be a first half and a second half, respectively. Further, the hearing aid comprises a first substrate arranged in the housing. Further, the hearing aid comprises an input transducer arranged at the first substrate, and the input transducer may be configured to provide a signal representing sound. Such signal may be obtained via one or more A/D converters, amplifiers etc. The first substrate may further include a conductive area being at least part of a radio frequency antenna. The conductive area may be a layer in or on the substrate. The first substrate may be arranged at the first end of the housing. The hearing aid may include a battery arranged in the housing at the second end of the housing. The hearing aid may include a second substrate arranged in the housing. In such a hearing aid, such a second substrate may be arranged at least partly in an area, or space, between the first substrate and the battery. The hearing aid may include a wireless interface arranged in the housing. Such a wireless interface may be configured to transmit and/or receive electromagnetic signals to/from the radio frequency antenna via a feed connected to the first substrate. The wireless interface may be termed a radio. The wireless interface may be configured to operate at a first operational frequency. The first operational frequency may be defined as an operational frequency range. In a hearing aid as described herein, the hearing aid may further comprise a connector configured to connect to an external speaker unit device configured to be placed at least partly in an ear canal of the user. In such a configuration the hearing aid may be termed a receiver-in-the-ear or receiver-in-the-canal hearing aid. At least one decoupling element may be configured to provide a dampening of electrical signals at the first operational frequency and may be arranged in an electrical path to/from the connector. Such a decoupling element may reduce electromagnetic coupling in the hearing aid, such as between the connector wire and hearing aid/antenna.

In a hearing aid as described herein, the housing may define a top part and an opposite bottom part, wherein the first substrate may then be positioned closer to the top part of the housing, and the connector may be positioned between the first substrate and the bottom part of the housing. The housing may include a rack module configured to hold other components of the hearing aid, such as circuit boards, microphones, speaker and/or battery.

In a hearing aid as described herein, the first substrate may be arranged in the hearing aid so that a top surface of the first substrate is substantially parallel to a top part of the hearing aid. Here the top part of the hearing aid is to be understood the part of the hearing aid facing away from the ear when the hearing aid is placed on-top of the pinna. An underside of the first substrate, opposite of the top side of the first substrate, may then be arranged so that it faces a bottom side of the hearing aid. The bottom side of the hearing aid then being the side or part that rest against the pinna when the hearing aid is worn in it's intended operational state at the ear of a user. This especially applies when the hearing aid is of the behind-the-ear type and/or receiver-in-the-ear type. If the hearing aid comprises a first and a second substrate, these two substrates could be arranged so that they both have a top side facing the topside of the hearing aid. The first substrate and the second substrate may be arranged so that they are not parallel to each other, meaning that their top surfaces are not flush or parallel.

In a hearing aid as described herein, the housing may further define a first side and an opposite second side, wherein a ground connection from the first substrate to the conductive area may be formed at the first side of the housing. It may be arranged so that the antenna does not comprise any major parts extending along the sides of the housing. Of cause a part of the thickness of the substrate or substrates would extend for some minor measure along the side, but these parts would not contribute significantly to the antenna function.

In a hearing aid as described herein, an inductance may be arranged in the feed. An inductance may act as a filtering device and/or as a modification of the electrical length.

In a hearing aid as described herein, the feed may be arranged at a center plane of the housing, such as may be arranged halfway between the first and the second side of the housing. By placing the feed at a center plane of the (outer) housing, a more symmetrical antenna may be achieved. The placement could also reduce asymmetry of the housing, which would be less attractive to a user.

In a hearing aid as described herein, the second substrate may include a fold and a subsection being folded around 90 degrees relative to a main part of the second substrate, and wherein the battery may then be positioned adjacent the subsection and the main part of the second substrate. Folding a part of the substrate could help utilize the space inside the housing and/or ensure that components, such as connectors etc., are placed optimally relative to e.g. external contact interfaces.

In a hearing aid as described herein, the first substrate may include an opening communicating with the input transducer and the input transducer may be positioned at a bottom part of the first substrate, the opening may further be in communication with a housing opening allowing sound to enter the input transducer.

In a hearing aid as described herein, the hearing aid may further comprise a coil configured for inductive communication with a contralaterally positioned second hearing aid, or other external units configured for such inductive communication, and wherein the coil defines a longitudinal axis, wherein the coil is arranged in the hearing aid housing so that the longitudinal axis extends approximately perpendicular to the lengthwise direction of the housing seen from the first end to the second end. Advantageously the coil may be placed or arranged in the housing at a point where it will most likely have its axis pointing towards a contralaterally placed hearing aid with which it is intended to communicate using this coil. Such a location may be at an end of the hearing aid, such as an end opposite the end where an external speaker unit device is to be attached.

In a hearing aid as described herein, the coil may be positioned at the second end. It may be beneficial that the coil could be positioned at the extreme end of the housing in the second part or end, i.e. away from the end where the wire connecting the behind-the-ear housing with the in-the-ear housing.

In a hearing aid as described herein, the hearing aid may further comprise a telecoil arranged at the second end of the housing so that in a worn state of the hearing aid, a center axis of the telecoil may then be arranged substantially vertically.

In a hearing aid as described herein, the hearing aid may further comprise a screen device arranged at the telecoil, wherein the screen device is configured to block or reduce electromagnetic signals from the hearing aid being induced into the telecoil as electromagnetic noise.

In a hearing aid as described herein, the first substrate and the second substrate may be formed from the same substrate and at least one decoupling element may be arranged at an electrical connecting between the first substrate and the second substrate. This could allow the establishment of a ground plane at one of the substrates, or at least to ensure that RF signals do not enter, or at least are dampened, the other substrate.

In a hearing aid as described herein, the first substrate and the second substrate may be formed from difference substrate components and sub-connected, and at least one decoupling element may then arranged at an electrical connecting between the first substrate and the second substrate. By dividing the substrates into smaller substrate, this potentially allows to arrange the smaller substrates in a more space-utilization optimized way, e.g. with a view to the size/height of components on each substrate and/or other components/devices inside the hearing aid.

In a hearing aid as described herein, the hearing aid may further comprise an energy storage structure, such as a rechargeable battery, arranged at the second end of the housing, wherein a part of the antenna is arranged between a top side of the housing and the battery.

In a hearing aid as described herein, the hearing aid may further comprise a coil configured for inductively communication with an external device, such as another hearing aid. This allows for provision of an inductive link with low power consumption for data communication to the other/ipsilateral hearing aid. Such a coil may be positioned in the hearing aid so that it's lengthwise axis will be substantially parallel to the lengthwise axis of the coil in the ipsilateral hearing aid. The coil may be positioned in an area between a battery and an end of the housing/body of the hearing aid.

A telecoil may be arranged in a hearing aid as disclosed herein. Such a telecoil should be positioned so that during use of the hearing aid, the telecoil has an axis arranged vertical so as to be able to pick up telecoil, baseband modulated signal from an installation in a room. Alternatively, or additionally, the hearing aid may be configured so that it is able to receive Aura cast signals, which is a Bluetooth-based protocol for hearing aids.

In a hearing aid as described herein, the hearing aid may be configured so that a battery is positioned at the second end of the hearing aid, and the first substrate and the battery do not overlap when viewed along a lengthwise direction of the housing, e.g. when viewed from above or below.

In a hearing aid as described herein, the hearing aid may be configured so that one or more conductive areas are configured to function as an antenna. The one or more conductive areas may be formed on a single substrate. The one or more conductive areas may be The antenna may be constructed or configured so that it is restricted or defined by this or these areas alone. Such a restriction or limitation of the antenna could be established using decoupling components arranged so as to decouple electromagnetic coupling from the area to other, neighboring elements inside the hearing aid, and/or possibly also decoupling of any wires connected to the hearing aid, such as wires leading signals to/from an in-the-ear component

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
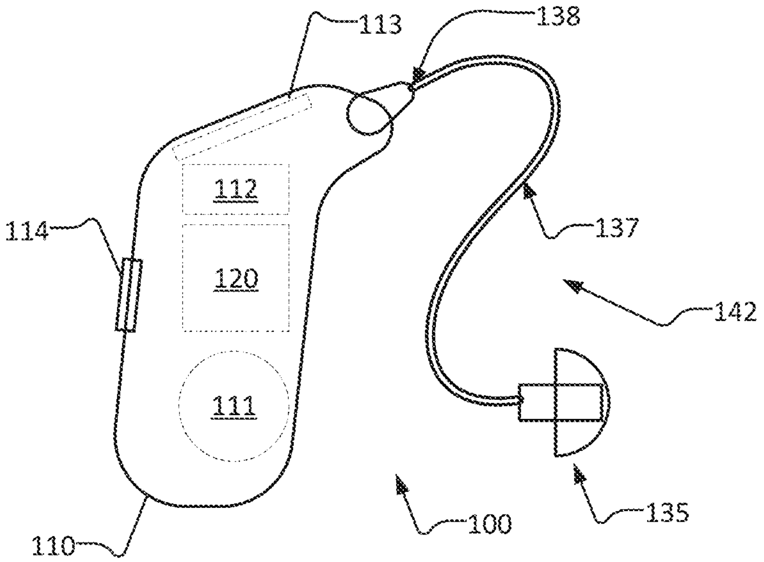
FIG. 1 schematically illustrates a hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device (or hearing instrument, hearing assistance device) may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid, or iv) arranging a unit of the hearing device as an entirely or partly implanted unit such as in a Bone Anchored Hearing Aid. The hearing device may be implemented in one single unit (housing) or in a number of units individually connected to each other.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal.

FIG. 1 schematically illustrates a hearing aid 100, which has a housing 130. Here the housing is illustrated as a shell, however, in an alternative, or as a supplement, at least part of the housing 110 may be constituted by an encapsulation material. Reference to housing in the present context is considered equivalent to referring to an encapsulation having similar geometrical configuration, such as an encapsulation material defining a somewhat elongated shape suitable to be placed behind the ear/pinna of a user/wearer. In the version where the housing is or comprise a shell, the shell may be made up of at least two parts, such as a top part and a bottom part.

The hearing aid 100 comprises an antenna 113. The antenna 113 is interconnected with a wireless interface 112, such as a Bluetooth-compatible radio device, such as a Bluetooth Low Energy enabled device, such as an Aura-cast enabled device, such as a wireless interface with a proprietary protocol, or any combinations thereof.

The hearing aid 100 further comprises a signal processor 120 configured to receive electrical signals from one or more input unit comprising one or more microphones. The signal processor 120 is configured to process the electrical signals to a hearing loss compensated signal to be output to a user/wearer via an output transducer, such as the speaker 135.

The hearing aid 100 further comprises a battery 111, which may be either rechargeable or at least exchangeable when depleted. When the battery is rechargeable, the recharging may be performed by contact charging, e.g. via a set of pins, such as two or more, pins arranged so as to be accessible/contactable when the hearing aid 100 is placed in a charger.

Alternatively, or supplementally, charging may be performed wirelessly, such as via inductive or resonant charging. When being charged via contact charging, the hearing aid 100 could be configured so as to communicate with the charger via the charging pins, or via one or more dedicated communication pins. Communication between the charger and the hearing aid, e.g. data, may be overlaid or intermittently communicated to/from the hearing aid while charging, before charging commences and/or when charging ends. At the end of a charge cycle, the hearing aid 100 could communicate a state of charge to the charger. This could also be performed at points in time during the charging process so as to ensure that the battery is not over charged.

A member 137 connecting the housing 110 and the speaker 135 may be pre-shaped so that it directs the speaker 135 towards the ear canal of the user when the housing 110 is placed at the correct side of the head of the user. The shaping may be applied to the member e.g. during a fitting session at a dispenser, such as at a hearing care professional or alternatively, or in combination wherewith, during production. The member 137 comprise a connector 138 connecting to the housing 110. The speaker 135, member 137 and connector 138 are often referred to as a speaker unit 142. The speaker unit 142 may comprise a memory unit configured to store information relating to the speaker unit 142, such as speaker unit characteristics including one or more of: maximum power output, frequency characteristics, identification or information relating to elements included in the speaker unit, such as microphone, accelerometer, temperature sensor, pressure sensor, light sensor, processor, bio sensor.

A user interface 114, such as one or more buttons, allows the user to manually interact with the hearing aid 100. The user interface 114 may alternatively, or supplementary, be constituted by interaction via a device with a graphical user interface, such as a smartphone or the like, which then wirelessly communicate with the hearing aid 100.

Figure 2:
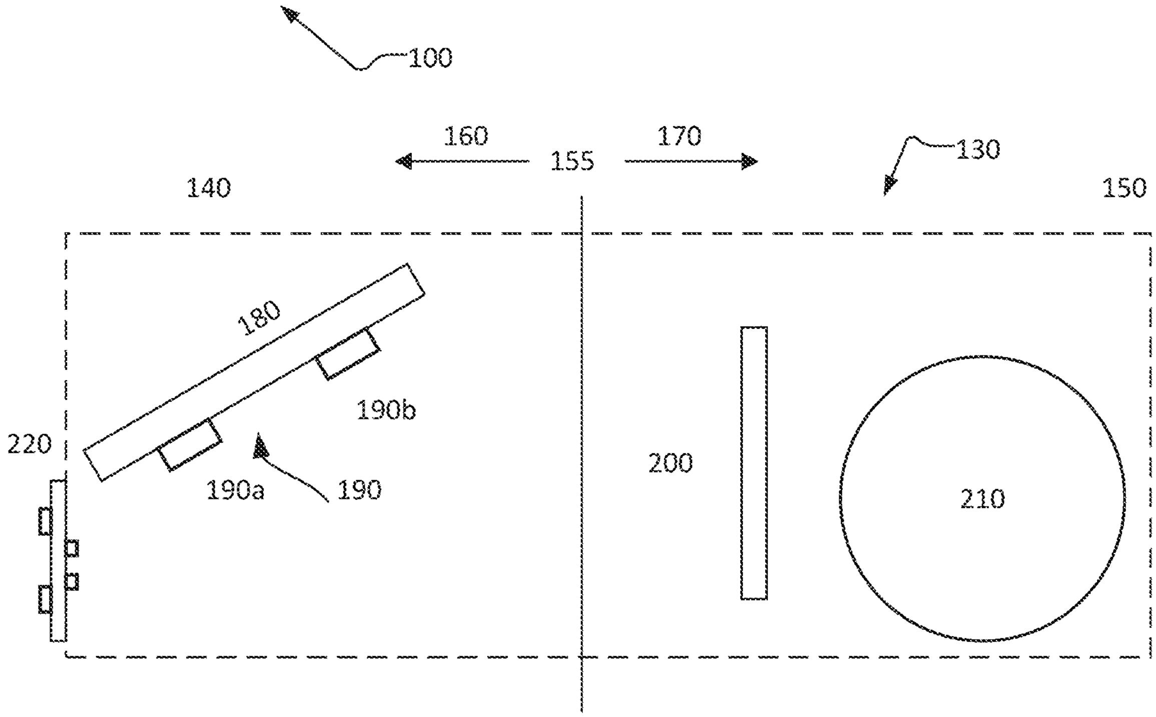
FIG. 2 schematically illustrates components and substrates in a hearing aid, FIG. 3 schematically illustrates a substrate in a hearing aid, and FIG. 4 schematically illustrates a substrate in a hearing aid.

FIG. 2 schematically illustrates the housing 130, which has a first end 140 and a second end 150 opposite the first end 140, illustrated as being conceptually divided by the line 155. The first 140 extends from the line 155 in the direction of the arrow 160. The second end 150 extends from the line 155 in the direction of the arrow 170. The housing 130 is configured to be positioned at the ear of a user, such as behind a pinna of the user. The housing 130 may be formed so that it may fit behind either the left or the right pinna without any modifications to the housing.

FIG. 2 further schematically illustrates a first substrate 180 arranged in the housing 130. The first substrate is here illustrated as being substantially flat, however, the first substrate may include one or more bends or curvatures. At the first substrate 180, an input transducer 190 is arranged, the input transducer is configured to provide a signal representing sound. The input transducer here comprises two microphone devices 190*a*, 190*b* arranged at an underside of the first substrate 180. The two microphones 190*a*, 190*b* maybe MEMS microphones. The input transducer is in fluid connection with an inlet structure in the housing 150 so that environmental sounds may reach the input transducer.

The first substrate 180 further includes a conductive area, such as a layer or part of a layer in a printed circuit board structure, such as in a flexible printed circuit board. The conductive area is at least part of a radio frequency antenna. The radio frequency antenna may be formed by the conductive area at the first substrate exclusively, or, the radio frequency antenna may be formed by the conductive area at the first substrate and further conductive parts.

As illustrated in FIG. 2, the first substrate 180 may be arranged at the first end 140 of the housing 110. Although illustrated as being at/near the extreme end of the first end 140 of the housing 110, the first substrate 180 may be positioned closer to the second end 150 than illustrated.

As the hearing aid is to be portable and wearable by a user, the hearing aid comprises a battery 210 arranged in the housing 130 at the second end 150 of the housing. The battery is illustrated as circular, but could have other shapes. The battery could be a secondary cell which may be charged, discharged and recharged many times. The battery could be charged using wired/contact charging or wireless charging.

In the housing 130, a second substrate 200 is arrange. The second substrate 200 is arranged at least partly in an area or space between the first substrate 180 and the battery 210. Here the second substrate 200 is illustrated as being oriented parallel with a midline 155 of the housing 130, but the second substrate 200 could be arranged to have other angles with the midline. Here the first substrate 180 and the second substrate 210 are illustrated as separate, i.e. not connected, however, it will be advantageous that some sort of connection is established between the two parts, such as signal connections so as to e.g. establish a signal path from the input transducer 190 to a signal processor located at the second substrate 200. Decoupling components may be added so that the substrate 200 is electrically isolated from the antenna, at least at certain frequencies.

In the hearing aid 100, a wireless interface is arranged. The wireless interface is configured to transmit and/or receive electromagnetic signals to/from the radio frequency antenna via a feed connected to the first substrate. The wireless interface could be configured to transmit and/or receive data using a communication protocol. Such protocol could be proprietary or standardized. The wireless interface is configured to operate at a first operational frequency. The antenna may be configured to have an operational frequency in the range of 1 to 6 GHZ, such as around 2.4 GHz, such as around 5.1 GHz.

The hearing aid further comprises a connector 220 configured to connect to an external speaker unit device. The connector is here a socket but could alternatively be a plug. The speaker unit device includes a housing which is configured to be placed at least partly in an ear canal of the user. This is a configuration often referred to as a RITE or RIE hearing aid meaning that the receive (output transducer) is positioned in the ear canal of the user during use of the hearing aid. At the connector 220, at least one decoupling element 230 is arranged. The decoupling element 230 is configured so as to provide a dampening of electrical signals at the first operational frequency, meaning that it will dampen or eliminate signals at the antenna operational frequency from any wire in the speaker unit device, which again means that a wire in the speaker unit device will not be part of the antenna. The decoupling element 230 is arranged in an electrical path to/from the connector or at the connector 220. Preferably, when multiple wires are present in the speaker unit device, a decoupling element is preferably provided for each wire or connection, at least for the wires/connections in the speaker unit device which actually connect to an electrical path inside the housing. The decoupling element or elements could be placed in a plug of the speaker unit and/or inside the housing of the hearing aid. Several decoupling elements might be useful in order to ensure that the signal is sufficiently decoupled/dampened. A decoupling element, or multiple, may be placed in the wires near the connector 138, or inside the connector 138, such as between contact elements of the connector 138 and the wires in the member 137. As a decoupling component may not provide sufficient damping at the intended frequency, more decoupling components may be added in series connection.

As illustrated in FIG. 2, the hearing aid 100 comprises an internal antenna structure 180, where a microphone structure is used as the basis of the antenna. As mentioned elsewhere, internal antenna is to be understood as internal to a housing and/or outer surface. The microphone structure/antenna structure is fed at the rear microphone through a dedicated antenna feed structure. In case external components, such as a wire in an external speaker unit device, is decoupled from the internal antenna, the antenna is solely comprised of internal components. If such a wire of an external speaker unit is not decoupled, the wire may be part of the antenna, and the antenna would thus comprise both an internal element and an external element.

Figure 3:
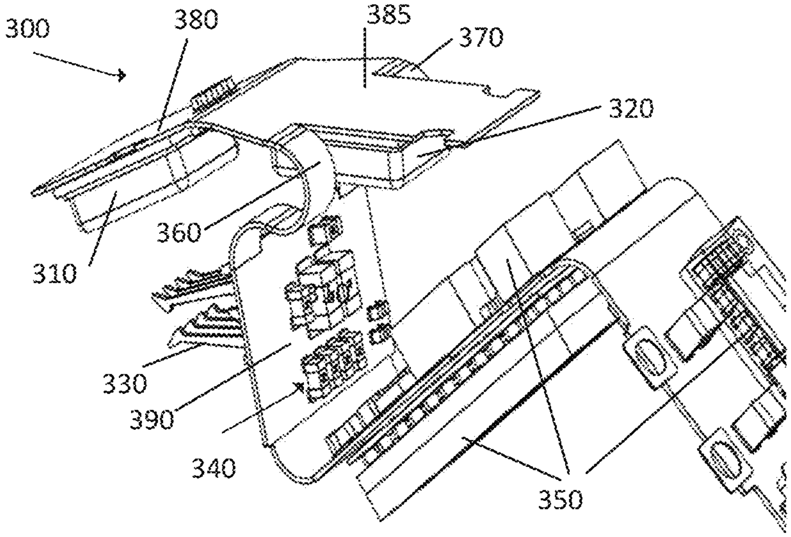

FIG. 3 illustrates a structure 300 similar to that of FIG. 2, but here the microphone structure/antenna structure is fed with a dedicated antenna feed structure located at one side of a wire connector. Here the structure has a first microphone 310 and a second microphone 320. The first and second microphones are MEMS microphones. Inlet holes are formed in the surface but not illustrated here. A further inlet structure may be added between the substrate 380/385 and an outer shell, also not illustrated. An antenna ground 370 connection is placed on the opposite side of the wire connector, and microphone signals, supply and ground are all routed along with the antenna ground 370 to avoid that these lines influence antenna performance. This antenna structure results in an improved 2.4 GHz link quality to a connectivity device (typically a mobile phone) placed in a front pocket of the wearer, such as a front pocket in a pair of pants/jeans or in a front pocket of a shirt.

The asymmetric design of the antenna structure, with antenna feed 360 on one side and antenna ground 370 on the other side of the wire connector 330, results in an asymmetric antenna performance. This means that radiation efficiency may be different when the hearing instrument is placed on left or right ear. The asymmetry in antenna performance can be modified by changing the inductance in the antenna feed and antenna ground. The inductance in the antenna feed or antenna ground can be modified by changing the length and width of the feed or short. The inductance can also be modified by introducing discrete inductors in the antenna feed or antenna short.

Further, a number of decoupling elements 340 are placed on a substrate 390 where a connector socket 330 is located at the opposite sided of the substrate. The combined microphone and antenna structure is formed on a substrate which is connected to a substrate carrying a multitude of electronic components, which include sound processor, wireless interface etc. This substrate includes a bend so that a first part of the substrate at 390 is approximately perpendicular to a second part of the substrate.

The substrate of the antenna and microphone assembly include a slight bend located between the two microphones.

The microphones 310 and 320 are located at a lower side of the antenna substrate. Here the microphones are MEMS microphones. The microphones are connected to openings in the hearing aid housing, not illustrated here. Such connection may include filters, such as earwax or residue filter to reduce ingress of cerumen, sweat and the like which may block or damage the microphone(s).

Figure 4:
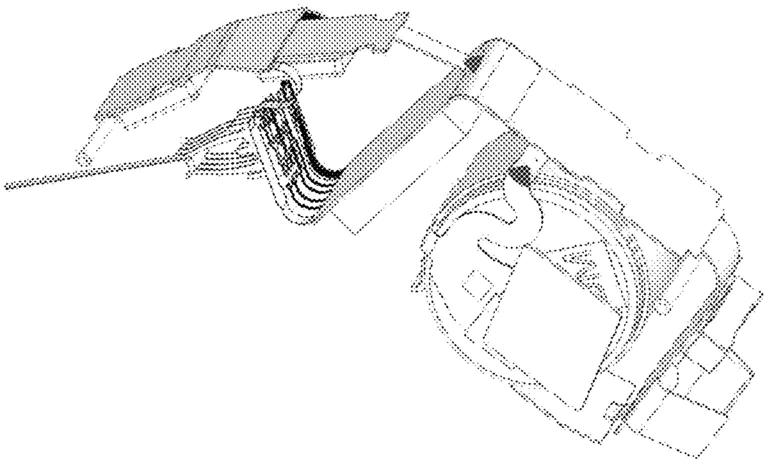

FIG. 4 illustrates a structure also similar to that of FIGS. 2 and 3, but unlike FIG. 3 here the antenna feed connects via a bridge 410, thereby forming a loop-like structure. Here antenna ground paths are formed on both sides of the wire connector. Microphone signals, supply and ground are all routed along with one or both antenna ground paths to avoid these lines influencing antenna performance. This antenna structure results in an improved 2.4 GHz link to a connectivity device (typically a mobile phone) placed in a front pocket of a wearer.

The placement of antenna feed point(s)—away from the wire connector—reduces the RF coupling to the wire in the speaker unit device, and thereby reduces the negative impact of the wire in the speaker unit device on the antenna performance. The proposed antenna design may also be mechanically simpler and easier to implement than an internal antenna structure placed on a separate flex structure. The symmetric design of the antenna further leads the antenna performance to be symmetric with respect to placement of the hearing aid at either left or right ear, so that a need for a specialized left or right device is reduced.

The wire connecting the behind-the-ear housing to the in-the-ear housing (referred to as a RITE wire)—although not part of the antenna structure—potentially has a big influence on the antenna performance. Even though antenna currents induced on the RITE wire are reduced due to the antenna feed location, antenna performance can still drop significantly due to antenna currents on the RITE wire, and the improvement in the link to a phone in the front pocket can be reduced. It is therefore desirable to reduce the antenna currents on the RITE wire. One way to reduce antenna currents on the RITE wire is to "RF decouple" the RITE wire line with discrete decoupling coils, which have a high impedance at 2.4 GHz and a low impedance at lower frequencies.

As mentioned, these RF decouplers, or simply decoupling elements, may be located inside the hearing aid housing, such as near the point where the wire connects to a substrate, such as a PCB. Preferably, the substrates in the hearing aid are substantially rigid, however, some flexibility in at least parts of the substrate can be beneficial, especially in the regions where bends are introduced. This could be achieved by combining multiple different substrates, or thinning of substrates in the regions in need of bending or adding stiffeners to a flexible PCB in regions that need a higher stiffness.

The housing, not illustrated, of the hearing aid defines a top part and an opposite bottom part, these parts need not be detachable from each other, but may be. Preferably, the first substrate is positioned closer to the top part of the housing than to the bottom part. Also preferably, the connector is positioned between the first substrate and the bottom part of the housing, i.e. between the antenna and the bottom part of the housing.

The housing further defines a first side and an opposite second side, these sides are connected to the top and bottom parts so as to establish a housing. Some sort of closing at the respective ends are also included. As explained above, the ground connection for the antenna running from the first substrate to the conductive area may be formed at the first side of the housing, i.e. at a left or right side of the housing.

For use as a decoupling element, an inductance may be arranged in the feed. The feed may be arranged at a center plane of the housing, alternatively the feed could be arranged approximately halfway between the first and the second side of the housing.

As shown above in FIGS. 3 and 4, the second substrate could include a fold or bend, where a subsection is folded approximately 90 degrees relative to a main part of the second substrate, and the battery is then advantageously positioned adjacent the subsection and the main part of the second substrate. As illustrated in FIGS. 3 and 4, the battery is then located in a space created by these two pieces of the substrate.

As the microphones are located below the first substrate, i.e. below the antenna, the first substrate includes an opening communicating with the input transducer. When the input transducer is made up of more microphone elements, as in FIGS. 3 and 4, each microphone preferably is associated with a respective opening in the substrate.

Although not illustrated, the hearing aid further comprises a coil configured for inductive communication with a contralaterally positioned second hearing aid. This enables a low powered communication with the contralaterally placed hearing aid. The coil defines a longitudinal axis, and the coil is arranged in the hearing aid housing so that the longitudinal axis extends approximately perpendicular to the lengthwise direction of the housing seen from the first end to the second end. When the two hearing aids are then placed at the respective ear of the user, the two coils will be substantially aligned.

The coil is positioned at the second end of the housing, preferably at the extreme end of the housing, such as between the battery and the housing.

The hearing aid may further comprise a telecoil arranged in the housing, such as at the second end, so that in a worn state of the hearing aid, a center axis of the telecoil is arranged substantially vertically. The telecoil allows for the hearing aid to receive baseband encoded audio.

In the hearing aid, a screen device may be arranged at the telecoil. Such a screen device may be configured to block or reduce electromagnetic signals from the hearing aid being induced into the telecoil as electromagnetic noise. This is contemplated to improve the signal-to-nose ratio from the telecoil.

As the lower part of the hearing aid, an coil may be placed. Such a coil may be used for inductive communication with a contralaterally placed hearing aid, and/or as input in a wireless charging system/scenario.

As shown in FIG. 4, some flaps may be arranged so as to provide a level of shielding to a telecoil arranged between the flaps. The flaps may be part of main substrate/pcb or be separate part/parts.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid comprising an outer structure having a first end and an opposite second end, the outer structure being configured to be positioned at the ear of a user, a first substrate arranged in the outer structure, an input transducer arranged at the first substrate, the input transducer configured to provide a signal representing sound, wherein the first substrate further includes a conductive area being at least part of a radio frequency antenna, wherein the first substrate is arranged at the first end of the housing, a battery arranged in the outer structure at the second end of the outer structure, a second substrate arranged in the outer structure, the second substrate arranged at least partly in an area between the first substrate and the battery, a wireless interface arranged in the outer structure, the wireless interface configured to transmit and/or receive electromagnetic signals to/from the radio frequency antenna via a feed connected to the first substrate, the wireless interface configured to operate at a first operational frequency, the hearing aid further comprising a connector configured to connect to an external speaker unit device configured to be placed at least partly in an ear canal of the user, wherein at least one decoupling element configured to provide a dampening of electrical signals at the first operational frequency is arranged in an electrical path to/from the connector.

2. The hearing aid according to claim 1, wherein the outer structure is a housing having a top part and an opposite bottom part, wherein the first substrate is positioned closer to the top part of the housing, and the connector is positioned between the first substrate and the bottom part of the housing.

3. The hearing aid according to claim 1, wherein the outer structure further defines a first side and an opposite second side, wherein a ground connection from the first substrate to the conductive area is formed at the first side of the outer structure.

4. The hearing aid according to claim 1, wherein an inductance is arranged in the feed.

5. The hearing aid according to claim 1, wherein the feed is arranged at a center plane of the outer structure.

6. The hearing aid according to claim 1, wherein the second substrate includes a fold and a subsection being folded around 90 degrees relative to a main part of the second substrate, and wherein the battery is positioned adjacent the subsection and the main part of the second substrate.

7. The hearing aid according to claim 1, wherein the first substrate includes an opening communicating with the input transducer and wherein the input transducer is positioned at a bottom part of the first substrate, the opening further being in communication with a housing opening allowing sound to enter the input transducer.

8. The hearing aid according to claim 1, wherein the hearing aid further comprises a coil configured for inductive communication with a contralaterally positioned second hearing aid, and wherein the coil defines a longitudinal axis, wherein the coil is arranged in the outer structure so that the longitudinal axis extends approximately perpendicular to the lengthwise direction of the outer structure seen from the first end to the second end.

9. The hearing aid according to claim 8, wherein the coil is positioned at the second end.

10. The hearing aid according to claim 1, further comprising a telecoil arranged at the second end of the outer structure so that in a worn state of the hearing aid, a center axis of the telecoil is arranged substantially vertically.

11. The hearing aid according to claim 10, further comprising a screen device arranged at the telecoil, wherein the screen device is configured to block or reduce electromagnetic signals from the hearing aid being induced into the telecoil as electromagnetic noise.

12. The hearing aid according to claim 1, wherein the feed is arranged halfway between the first and the second side of the outer structure.

* * * * *